US008901852B2

(12) United States Patent
Wendt

(10) Patent No.: US 8,901,852 B2
(45) Date of Patent: Dec. 2, 2014

(54) THREE-LEVEL LED BULB MICROPROCESSOR-BASED DRIVER

(71) Applicant: Switch Bulb Company, Inc., San Jose, CA (US)

(72) Inventor: Rolf Wendt, Santa Rosa, CA (US)

(73) Assignee: Switch Bulb Company, Inc., San Jose, CA (US)

( * ) Notice: Subject to any disclaimer, the term of this patent is extended or adjusted under 35 U.S.C. 154(b) by 27 days.

(21) Appl. No.: 13/886,179

(22) Filed: May 2, 2013

(65) Prior Publication Data
US 2014/0327369 A1 Nov. 6, 2014

(51) Int. Cl.
*H05B 41/14* (2006.01)
*H05F 1/00* (2006.01)
*H05B 37/02* (2006.01)
*H05B 39/04* (2006.01)
*H05B 41/36* (2006.01)
*H05B 33/08* (2006.01)

(52) U.S. Cl.
CPC .................................. *H05B 33/0845* (2013.01)
USPC ........ 315/307; 315/186; 315/193; 315/209 R; 315/225; 315/291

(58) Field of Classification Search
None
See application file for complete search history.

(56) References Cited

U.S. PATENT DOCUMENTS

| | | | |
|---|---|---|---|
| 5,674,636 A | 10/1997 | Dodabalapur et al. | |
| 6,016,038 A | 1/2000 | Mueller et al. | |
| 6,577,247 B2 | 6/2003 | Giacaman | |
| 6,580,228 B1 | 6/2003 | Chen et al. | |
| 6,821,010 B2 | 11/2004 | Lo | |
| 6,836,079 B2 | 12/2004 | Hong | |
| 6,965,205 B2 | 11/2005 | Piepgras et al. | |
| 7,186,003 B2 | 3/2007 | Dowling et al. | |
| 7,748,877 B1 | 7/2010 | Colby | |
| 7,863,831 B2 | 1/2011 | Vos | |
| 8,198,819 B2 | 6/2012 | Lenk | |
| 8,217,588 B2 | 7/2012 | McKinney | |
| 8,294,722 B2 | 10/2012 | Hong et al. | |

(Continued)

FOREIGN PATENT DOCUMENTS

CN 201025738 Y 2/2008
CN 202679757 U 1/2013

OTHER PUBLICATIONS

Non-Final Office Action received for U.S. Appl. No. 13/485,911, mailed on Oct. 25, 2013, 7 pages.

(Continued)

*Primary Examiner* — Anh Tran
(74) *Attorney, Agent, or Firm* — Morrison & Foerster LLP

(57) ABSTRACT

An LED bulb is described, comprising LEDs within a shell and a driver circuit to operate the LEDs at a plurality of brightness levels. The driver circuit comprises first and second inputs to receive AC, a neutral input, a converter circuit, first and second rectifier circuits, a detector circuit, and a processing circuit. The first rectifier circuit is connected to the first and neutral inputs and rectifies the AC received. The second rectifier circuit is connected to the second and neutral inputs and rectifies the AC received. The detector circuit is connected to the first and second rectifier circuits. The processing circuit has a first and a second processor input, and is connected to the detector circuit. The processing circuit produces a chop signal with a duty cycle based on whether the first or second input is hot. The converter circuit powers the LEDs based on the chop signal.

16 Claims, 6 Drawing Sheets

(56) References Cited

U.S. PATENT DOCUMENTS

| | | |
|---|---|---|
| 8,299,724 B2 | 10/2012 | Huynh |
| 8,669,704 B2 * | 3/2014 | Marinus et al. ............... 315/35 |
| 2001/0022723 A1 | 9/2001 | Siminovitch et al. |
| 2008/0191628 A1 | 8/2008 | Marques et al. |
| 2010/0308739 A1 | 12/2010 | Shteynberg et al. |
| 2011/0175528 A1 * | 7/2011 | Rains et al. ................. 315/51 |
| 2012/0146538 A1 * | 6/2012 | Nerone ....................... 315/291 |
| 2012/0313540 A1 | 12/2012 | Lin et al. |
| 2013/0051001 A1 | 2/2013 | Miskin |
| 2014/0152187 A1 * | 6/2014 | Lin et al. ................. 315/200 R |

OTHER PUBLICATIONS

Non Final Office Action received for U.S. Appl. No. 12/561,514, mailed on Jan. 27, 2012, 11 pages.

Notice of Allowance received for U.S. Appl. No. 12/561,514, mailed on May 8, 2012, 10 pages.

Microchip Technology Inc., "LED Lighting Solutions", Adding Intelligence to Lighting Applications, LED Lighting Design Guide, available online at <http://ww1.microchip.com/downloads/en/DeviceDoc/01036f.pdf>, Summer 2010, pp. 1-20.

* cited by examiner

THREE-LEVEL LED BULB MICROPROCESSOR-BASED DRIVER

BACKGROUND

1. Field

The present disclosure relates generally to microprocessor-based drivers for light emitting diode (LED) bulbs, and more specifically to microprocessor-based drivers for LED bulbs that enable the LED bulb to emit light at different levels of brightness.

2. Description of Related Art

Conventional incandescent light bulbs that have three lighting levels ("three-way light bulbs") include two filaments; in the minimum illumination setting a low wattage filament is energized, in the medium illumination setting a medium wattage filament is energized, in the high illumination setting both filaments are energized. The illumination setting is selected by energizing a first input connected to the low wattage filament, energizing a second input connected to the medium filament, or energizing both the first and second inputs.

The conventional incandescent three-way light bulb has three electrical contacts, hot1, hot2, and neutral. A switch, contained in the lamp base, connects terminal hot1 to mains power (e.g., a 120 VAC 60 Hz signal in the United States) in the low power case, connects hot2 to mains power in the medium power case, and connects both hot1 and hot2 to mains power in the high power case. Terminal hot1 is connected to the low wattage filament and terminal hot2 is connected to the medium wattage filament. Thus, either or both filaments may be selected to provide three levels of illumination.

One method for reproducing the same functionality of the incandescent three-way light bulb in an LED bulb is to have two sets of LEDs with each set having its own driver connected to a different hot input. However, this requires having two driver circuits, which increases costs and increases space requirements that are limited when implementing LED bulbs in typical form factors of standard light bulbs. Therefore, it is desirable to connect multiple hot inputs to a single driver circuit. However, this requires the driver circuit to sense which of two terminals are energized and set the supply current of the LEDs accordingly. This could be done by inserting a component in series with each input and sensing the voltage drop across this series component. While this technique may work in principle, it would introduce power losses in the series component. Additionally, this technique requires many additional parts to amplify and detect the voltage. These parts increase the cost of the LED bulb, and are therefore undesirable.

BRIEF SUMMARY

A light emitting diode (LED) bulb is described. The LED bulb comprises a shell, a plurality of LEDs within the shell, and a driver circuit. The driver circuit is configured to operate the plurality of LEDs at a plurality of brightness levels. The driver circuit comprises a first input configured to receive alternating current (AC), a second input configured to receive AC, a neutral input, a converter circuit connected to the plurality of LEDs, a first rectifier circuit, a second rectifier circuit, one or more detector circuits, and a signal processing circuit. The first rectifier circuit is connected to the first input and the neutral input. The first rectifier circuit is configured to rectify the AC received at the first input into direct current (DC). The second rectifier circuit is connected to the second input and the neutral input. The second rectifier circuit is configured to rectify the AC received at the second input into DC. The one or more detector circuits are connected to the first rectifier circuit and the second rectifier circuit. The signal processing circuit has a first processor input and a second processor input. The signal processing circuit is connected to the one or more detector circuits. The signal processing circuit is configured to produce a chop signal with a duty cycle. The duty cycle is based on whether the first input is hot and whether the second input is hot. The converter circuit powers the plurality of LEDs at a driving current. The driving current is based on the chop signal.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

An exemplary LED driver circuit that can drive one or more LEDs at three different brightness levels by driving the LEDs at three different currents is described below. The driver circuit uses a microcontroller to sense the input line voltages from a three-way switch. This reduces the number of required parts. Accordingly, the driver circuit is suitable for use in an LED bulb.

Figure 1:
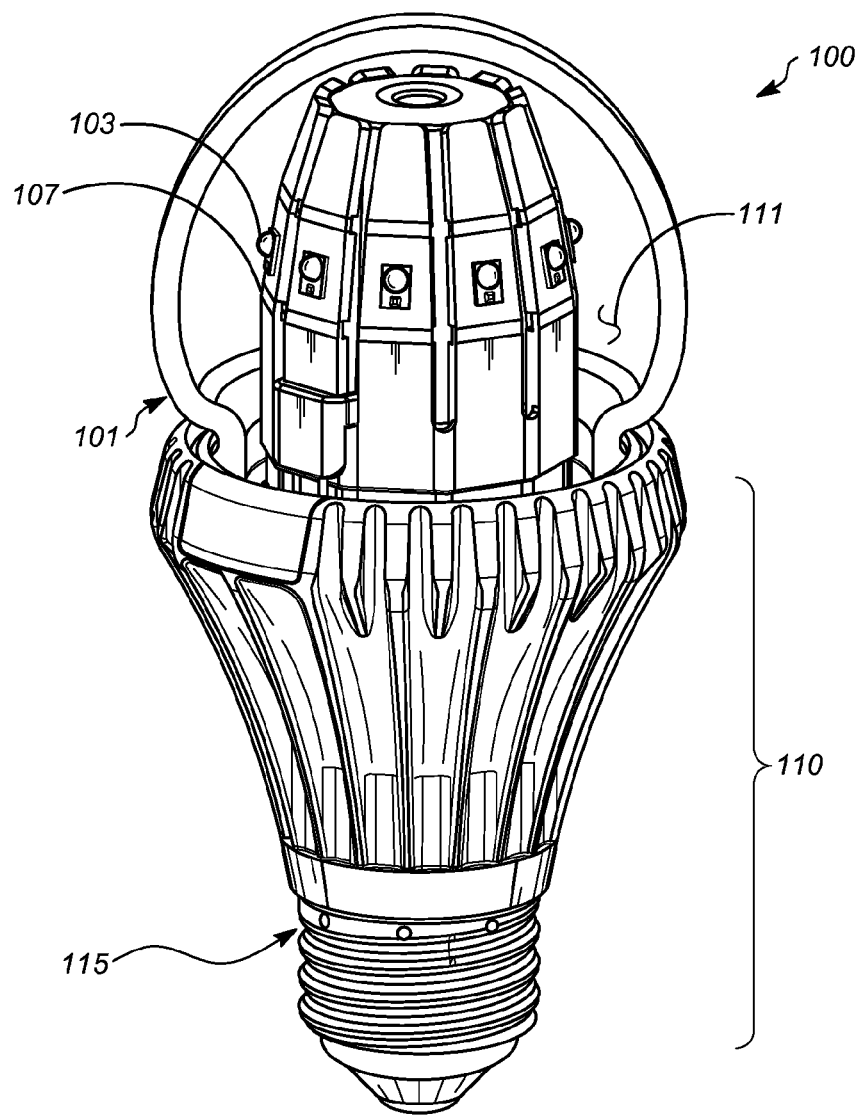
FIG. 1 depicts an exemplary LED bulb that may be used with the exemplary LED driver circuit for brightness control.

FIG. 1 depicts an exemplary LED bulb 100. The LED bulb maybe liquid-filled. LED bulb 100 includes a base 110 and a shell 101 encasing the various components of LED bulb 100. The shell 101 is attached to the base 110 forming an enclosed volume. An array of LEDs 103 are mounted to support structures 107 and are disposed within the enclosed volume. The enclosed volume may be filled with a thermally conductive liquid 111.

For convenience, all examples provided in the present disclosure describe and show LED bulb 100 being a standard A-type form factor bulb. However, as mentioned above, it should be appreciated that the present disclosure may be applied to LED bulbs having any shape, such as a tubular bulb, globe-shaped bulb, or the like.

Shell 101 may be made from any transparent or translucent material such as plastic, glass, polycarbonate, or the like. The shell 101 may be clear or frosted to disperse light produced by the LEDs. Shell 101 has a geometric center and an apex located at the top of the LED bulb 100 as it is drawn in FIG. 1.

As noted above, light bulbs typically conform to a standard form factor, which allows bulb interchangeability between different lighting fixtures and appliances. Accordingly, in the present exemplary embodiment, LED bulb 100 includes connector base 115 for connecting the bulb to a lighting fixture. In one example, connector base 115 may be a conventional light bulb base having threads 117 for insertion into a conventional light socket. However, as noted above, it should be appreciated that connector base 115 may be any type of connector for mounting LED bulb 100 or coupling to a power source. For example, connector base may provide mounting via a screw-in base, a dual-prong connector, a standard two- or three-prong wall outlet plug, bayonet base, Edison Screw base, single pin base, multiple pin base, recessed base, flanged base, grooved base, side base, or the like.

In some embodiments, LED bulb 100 may use 6 W or more of electrical power to produce light equivalent to a 40 W incandescent bulb. In some embodiments, LED bulb 100 may use 18 W or more to produce light equivalent to or greater than a 75 W incandescent bulb. Depending on the efficiency of the LED bulb 100, between 4 W and 16 W of heat energy may be produced when the LED bulb 100 is illuminated.

The LED bulb 100 includes several components for dissipating the heat generated by LEDs 103. For example, as shown in FIG. 1, LED bulb 100 includes one or more support structures 107 for holding LEDs 103. Support structures 107 may be made of any thermally conductive material, such as aluminum, copper, brass, magnesium, zinc, or the like. In some embodiments, the support structures are made of a composite laminate material. Since support structures 107 are formed of a thermally conductive material, heat generated by LEDs 103 may be conductively transferred to support structures 107 and passed to other component of the LED bulb 100 and the surrounding environment. Thus, support structures 107 may act as a heat-sink or heat-spreader for LEDs 103.

Support structures 107 are attached to bulb base 110 allowing the heat generated by LEDs 103 to be conducted to other portions of LED bulb 100. Support structures 107 and bulb base 110 may be formed as one piece or multiple pieces. The bulb base 110 may also be made of a thermally conductive material and attached to support structures 107 so that heat generated by LED 103 is conducted into the bulb base 110 in an efficient manner. Bulb base 110 is also attached to shell 101. Bulb base 110 can also thermally conduct with shell 101.

Bulb base 110 also includes one or more components that provide the structural features for mounting bulb shell 101 and support structure 107. Components of the bulb base 110 include, for example, sealing gaskets, flanges, rings, adaptors, or the like. Bulb base 110 also includes a connector base 115 for connecting the bulb to a power source or lighting fixture. Bulb base 110 can also include one or more die-cast parts.

LED bulb 100 may be filled with thermally conductive liquid 111 for transferring heat generated by LEDs 103 to shell 101. The thermally conductive liquid 111 fills the enclosed volume defined between shell 101 and bulb base 110, allowing the thermally conductive liquid 111 to thermally conduct with both the shell 101 and the bulb base 110. In some embodiments, thermally conductive liquid 111 is in direct contact with LEDs 103.

Thermally conductive liquid 111 may be any thermally conductive liquid, mineral oil, silicone oil, glycols (PAGs), fluorocarbons, or other material capable of flowing. It may be desirable to have the liquid chosen be a non-corrosive dielectric. Selecting such a liquid can reduce the likelihood that the liquid will cause electrical shorts and reduce damage done to the components of LED bulb 100.

LED bulb 100 may include a mechanism to allow for thermal expansion of thermally conductive liquid 111 contained in the LED bulb 100. In the present exemplary embodiment, the mechanism is a bladder 120. The outside surface of the bladder 120 is in contact with the thermally conductive liquid 111.

The LED bulb 100 further contains the driver circuit. Connector base 115 may include two hot contacts and a neutral contact. In exemplary LED bulb 100, the driver circuit may be driver circuit 200 discussed below with respect to FIG. 2 and is substantially contained within connector base 115. In this context, substantially contained means that the majority of the driver circuit is within connector base 115, but portions of driver circuit components may be protruding from connector base 115. For example, portions of the driver circuit may protrude above connector base 115 into bulb base 110 or shell 101. Similarly, the driver circuit may be substantially contained within bulb base 110.

The driver circuit may be integrated onto a single printed circuit board, which fits within the LED bulb 100. In one case, the driver circuit is integrated on a single printed circuit board and fits substantially within the bulb base or connector base of the LED bulb 100.

Figure 2:
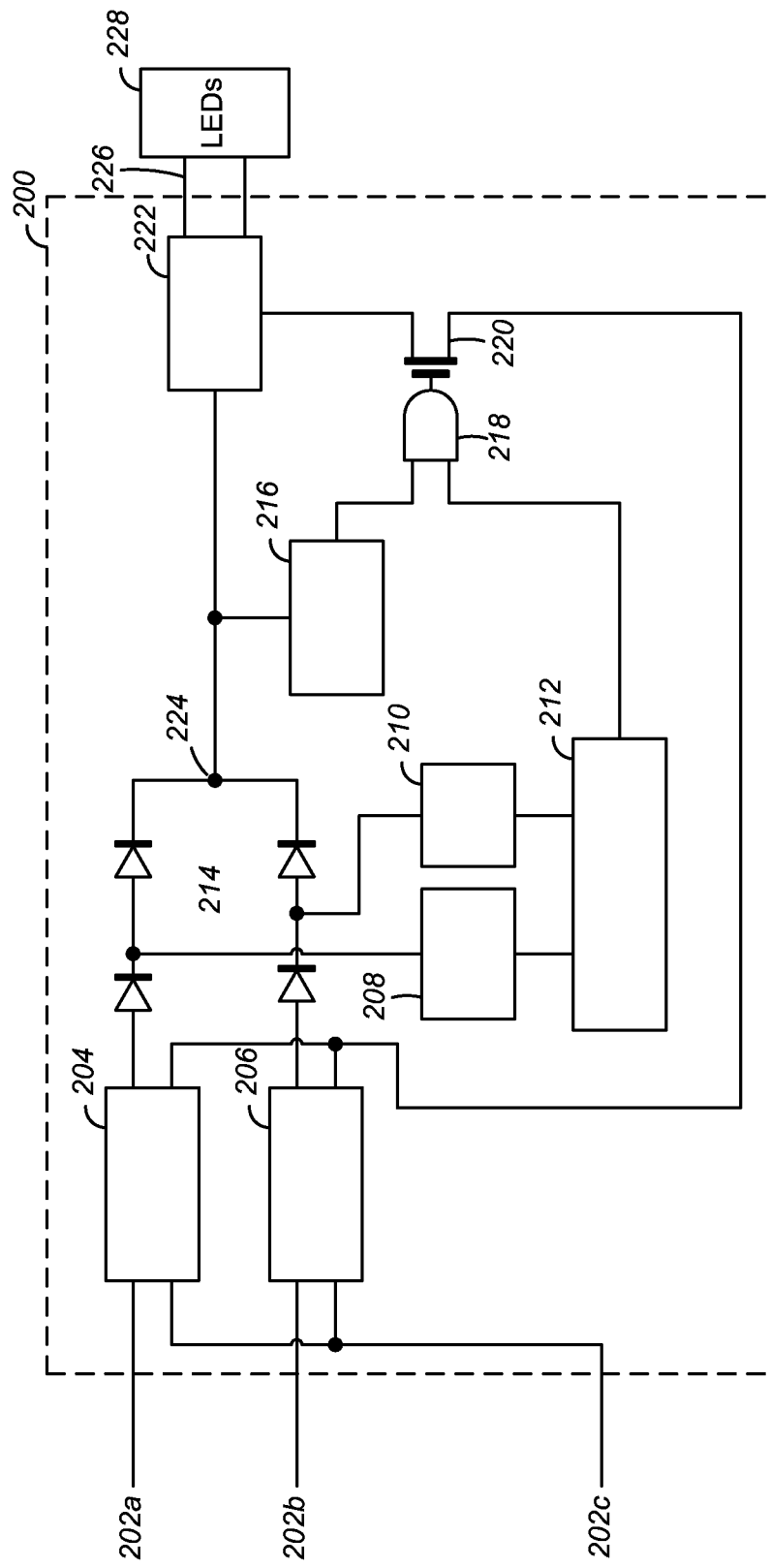
FIG. 2 depicts a block schematic of an exemplary LED driver circuit for brightness control.

FIG. 2 depicts a block schematic of an exemplary LED driver circuit 200 for brightness control. Driver circuit 200 may be used in an LED bulb to power one or more LEDs 228. Driver circuit 200 takes as input an input line voltage (e.g., 120 VAC, 60 Hz in the U.S.) from a three-way switch connected to input 202, which includes hot input 202a, hot input 202b, and neutral input 202c. At output 226, driver circuit 200 outputs a current suitable for powering the one or more LEDs 228. The three-way switch will energize hot input 202a only, hot input 202b only, or both hot inputs 202a and 202b at the same time. The one or more LEDs 228 will not be illuminated when the three-way switch does not energize any of hot inputs 202a and 202b.

As will be described in more detail below, driver circuit 200 includes rectifier circuits 204 and 206, detector circuits 208 and 210, signal processing circuit 212, diodes 214, SMPS power converter circuit 216, AND gate 218, FET switch 220, and converter circuit 222. Not all elements of driver circuit 200 are required. For example, some or all of the diodes 214 may be omitted.

The rectifier circuits 204 and 206 are configured to convert the alternating currents (AC) from the hot inputs 202a and 202b into direct currents (DC). For example, the rectifier circuits 204 and 206 may each be a full-wave bridge rectifier circuit. Alternatively, a single rectifier circuit may be configured to convert the AC from the hot inputs 202a and 202b into DC. When hot input 202a is energized, the rectifier circuit 204 outputs a continuous stream of half-sine waves, which are detected by detector circuit 208. Similarly, when hot input 202b is energized, the rectifier circuit 206 outputs a continuous stream of half-sine waves, which are detected by detector circuit 210.

The detector circuits 208 and 210 detect the state of the input lines as being above or below a threshold. In this example, detector circuits 208 and 210 are voltage level detector circuits that detect whether the voltage at their input is above or below a determined threshold voltage value. The detector circuits 208 and 210 output a high voltage signal when their inputs are above the determined threshold and output a low voltage signal when their outputs are below the determined threshold. The high voltage signal is relatively higher voltage than the low voltage signal. In one example, detector circuits 208 and 210 may each include a voltage splitter and a clamp. The voltage splitter portion of each detector circuit 208 and 210 reduces the voltage to a level useable by the signal processing circuit 212. The clamp portion of each detector circuit serves to fix the signal to a determined DC value, such as for a high voltage signal or a low voltage signal. Additionally, the detector circuits 208 and 210 may optionally include a comparator for providing a further level of accuracy.

The outputs of the detector circuits 208 and 210 are output to signal processing circuit 212. For example, the signal processing circuit may be a microprocessor, a state machine, a customized integrated circuit, or other logic circuit. The signal processing circuit 212 processes the input signals received from the detector circuits 208 and 210 to determine whether only hot input 202a, only hot input 202b, or both hot inputs 202a and 202b at the same time are energized. The signal processing circuit 212 may have two inputs, called a first processor input and a second processor input. For each of the first processor input and the second processor input, the signal processing circuit 212 determines whether a received processor signal at the processor input is active (on) or inactive (off). For each of the first processor input and the second processor input, the received signal is time-integrated to protect against noisy conditions. A processor signal into the signal processing circuit 212 is determined to be active by the signal processing circuit 212 when the ratio between the duration of a high voltage signal and the duration of a low voltage signal is above an active threshold value. Similarly, a processor signal into the signal processing circuit 212 is determined to be inactive by the signal processing circuit 212 when the ratio between the duration of a high voltage signal and the duration of a low voltage signal is below the active threshold. The status of the processor signal at each processor input is indicative of the status of a corresponding hot input. For example, when the processor signal at the first processor input is active, it indicates that hot input 202a is energized. When the processor signal at the second processor input is active, it indicates that hot input 202b is energized.

Various methods may be employed by the signal processing circuit 212 to determine the status of a processor signal. For example, a processor signal at a processor input may be determined to be active by the signal processing circuit 212 when the duration of a continuous high voltage signal exceeds a determined time. In another example, a processor signal at a processor input may be determined to be active by the signal processing circuit 212 when the duration of a continuous low voltage signal is less than a determined time. In another example, a processor signal at a processor input may be determined to be inactive by the signal processing circuit 212 when the duration of a continuous low voltage signal exceeds a determined time. In yet another example, a processor signal at a processor input may be determined to be inactive by the signal processing circuit 212 when the duration of a continuous high voltage signal is less than a determined time. Based on one or more of these durations at each processor input, the signal processing circuit 212 determines whether each of the hot inputs 202a and 202b are energized.

The signal processing circuit 212 is configured performing time integration on the processor signals at a processor input of the signal processing circuit 212. Time integration helps avoid incorrect results due to noisy conditions. It is advantageous to perform the time integration over two or more cycles before the signal processing circuit 212 makes a determination about the state of the hot inputs 202a and 202b.

Based on the determination of the states of the hot inputs 202a and 202b, the signal processing circuit 212 outputs a chopped signal, named Vchop. For example: when only hot input 202a is energized, the duty cycle of the output signal of the signal processing circuit 212, Vchop, is set to 25% (low illumination of LEDs); when only hot input 202b is energized, the duty cycle of the output signal of the signal processing circuit 212, Vchop, is set to 50% (medium illumination of LEDs); when both hot inputs 202a and 202b are both energized, the duty cycle of the output signal of the signal processing circuit 212, Vchop, is set to 100% (high illumination of LEDs).

The signal processing circuit 212 sets the duty cycle of Vchop by performing pulse width modulation (PWM). Thus, at a high level, the signal processing circuit 212 selects between various duty cycles based on whether only hot input 202a, only hot input 202b, or both hot inputs 202a and 202b at the same time are energized. Accordingly, the signal output by the signal processing circuit 212 is pulse width modulated with a duty cycle based on the inputs 202a and 202b. As discussed above, this pulse width modulated signal produced by the signal processing circuit 212 is called Vchop.

It is advantageous for Vchop to have a PWM switching frequency that is at least 10 times higher than the frequency of the combined output at diode connection 224. Assuming, for example, an input line frequency of 60 Hz at the hot inputs 202a and 202b, the combined output at diode connection 224 is a 120 Hz half sine wave. This 120 Hz signal is produced at diode connection 224 by combining the outputs of the bridge rectifier circuits 204 and 206. Thus, the minimum Vchop PWM switching frequency is 10 times higher than 120 Hz, which is 1.2 kHz. It is beneficial for Vchop to have a PWM switching frequency that is at least 10 times the frequency of the combined hot inputs 202a and 202b in order to reduce visible flickering in the illumination of the one or more LEDs 228. Similarly, the maximum Vchop PWM switching frequency is one-tenth the frequency of the signal produced by the SMPS power converter circuit 216. For example, assuming a frequency of 120 kHz for the signal produced by the SMPS power converter circuit 216, the maximum Vchop PWM frequency is 12 kHz.

The combined output at diode connection 224 is fed into the SMPS power converter circuit 216. The SMPS power converter circuit 216 performs a second PWM. For example, the SMPS power converter circuit 216 may perform PWM at a frequency of between 65 kHz and 120 kHz. This output of the SMPS power converter circuit 216 is used to drive current to the one or more LEDs 228.

The two pulse width modulated signals, Vchop and the output of the SMPS power converter circuit 216, are input into AND gate 218. The AND gate 218 combines the two signals as illustrated in FIG. 3. The output of the AND gate 218 controls FET switch 220. The FET switch 220 is connected to converter circuit 222. The converter circuit 222 may be a step-down DC to DC converter that converts the combined output at diode connection 224 into a voltage configured to drive the LEDs 228. In this example, converter circuit 222 is a buck-mode topology. Alternatively, the converter circuit 222 may be a flyback topology or other similar converter.

While FIG. 2 depicts a particular configuration of blocks, it should be understood that the blocks may be configured differently or some blocks may be omitted without deviating from embodiments of the present invention.

To further improve performance, the PWM switching frequency of Vchop can be dithered or varied. Dithering or varying the PWM switching frequency of Vchop improves power factor effects and total harmonic distortion effects by spreading the noise over a frequency range. For example, the PWM switching frequency of Vchop can be varied from 1 kHz to 3 kHz. In another example, the PWM switching frequency can be dithered to a range of frequencies, such as by switching among various PWM switching frequencies. The circuit may be configured to switch among the various PWM switching frequencies after a set number of periods.

Figure 3A:
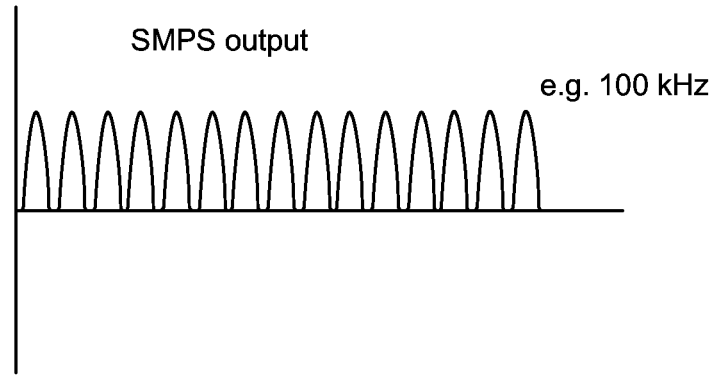
FIG. 3A depicts an exemplary graph of the output of an SMPS power converter in an exemplary LED driver circuit.
Figure 3B:
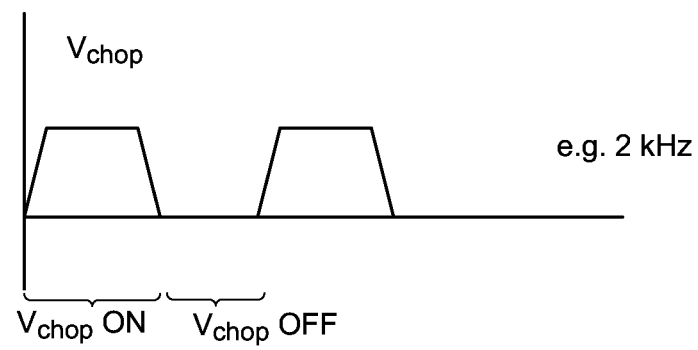
FIG. 3B depicts an exemplary graph of Vchop in an exemplary LED driver circuit.

FIG. 3 depicts graphs showing exemplary outputs at the output of the SMPS power converter circuit 216, at Vchop, and at the output of AND gate 218. For example, the SMPS output is a signal with a frequency of 100 kHz, as illustrated in FIG. 3A, and Vchop is a signal with a PWM switching frequency of 2 kHz, as illustrated in FIG. 3B.

Figure 3C:
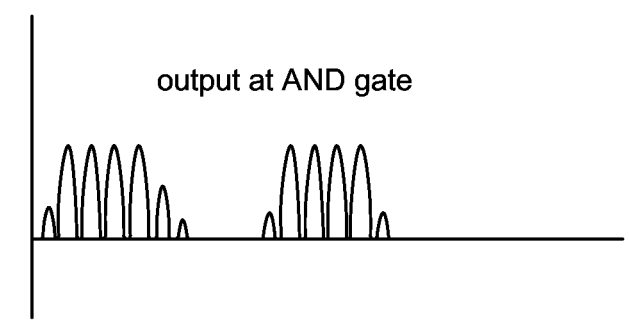
FIG. 3C depicts an exemplary graph of the output of an AND gate in an exemplary LED driver circuit.

For Vchop in FIG. 3B, the duty cycle is the percent of time that Vchop is ON as a fraction of the total period of the signal. In this example, the duration that Vchop is ON is the same as the duration for which Vchop is OFF. Thus, Vchop has a duty cycle of 50% and is said to be chopped at 50%. This case, where the duty cycle of Vchop is 50%, may exemplify the circumstance when only hot input 202b is energized. When Vchop and the output of the SMPS power converter circuit 216 are combined at the output of the AND gate 218, as illustrated in FIG. 3C, the result is a signal used for driving the one or more LEDs 228 with a medium intensity illumination. Similarly, a Vchop signal with a duty cycle of 25% would result in a signal that is ON for 25% of the signal period, and may exemplify the circumstance when only hot input 202a is energized.

Figure 4:
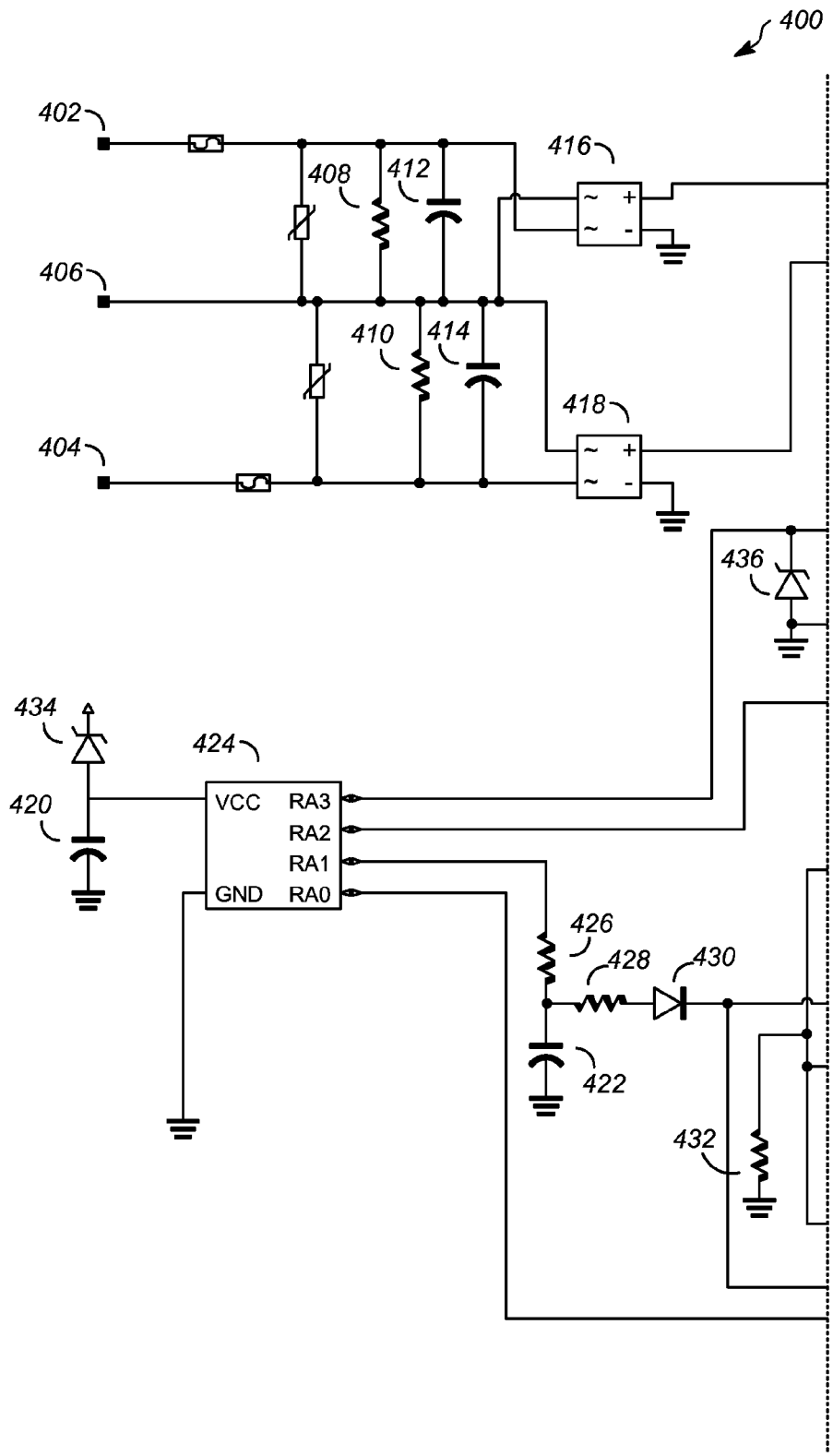
FIG. 4 depicts an exemplary circuit topology for an LED driver circuit.
Figure 4:
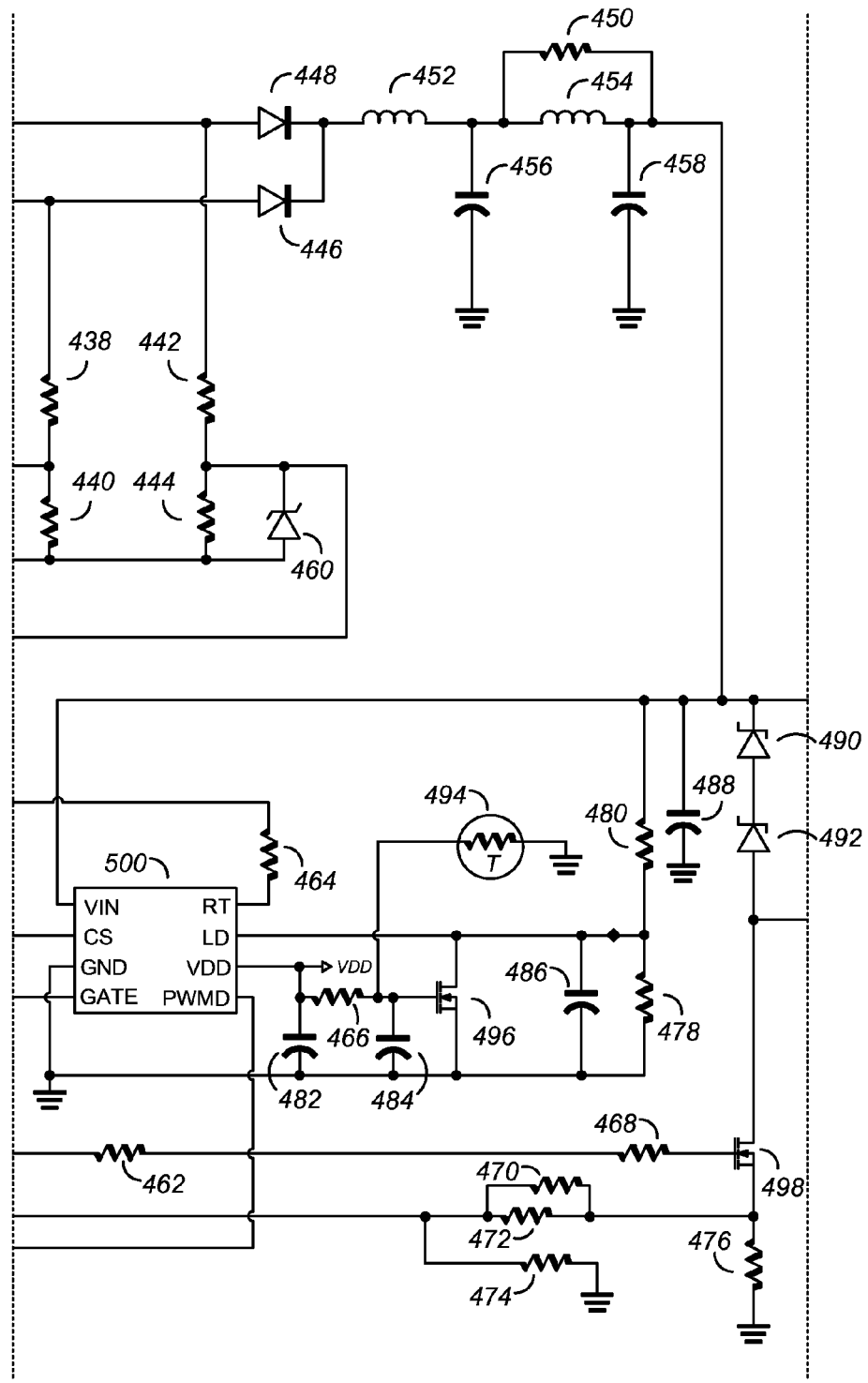
Figure 4:
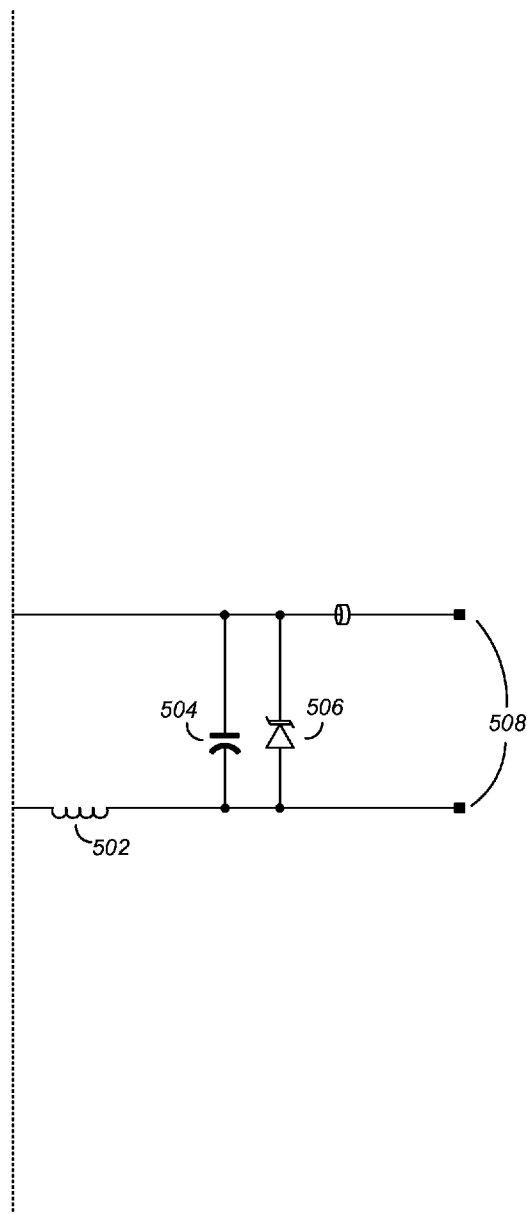

FIG. 4 illustrates an exemplary circuit topology 400 for an LED driver circuit. One of ordinary skill in the art will readily appreciate that different values of components may be used, that some components can be removed, some components can be added, and that some components may be re-arranged while maintaining a functional driver circuit.

Line 402 is a hot1 input, line 404 is a hot2 input, and line 406 is a neutral input. Components 408 and 410 are resistors. Components 412 and 414 are capacitors. Components 416 and 418 are rectifiers, which convert AC to DC. Components 420 and 422 are capacitors. Component 424 is a microchip, such as a PIC10F320. Components 426, 428, 432 are resistors. Component 430 is a capacitor. Components 434 and 436 are diodes. Components 438, 440, 442, and 444 are resistors. Components 446 and 448 are diodes. Component 450 is a resistor. Components 452 and 454 are inductors. Components 456 and 458 are capacitors. Component 460 is diode. Components 462, 464, 466, 468, 470, 472, 474, 476, 478, and 480 are resistors. Components 482, 484, 486, and 488 are capacitors. Components 490 and 492 are diodes. Component 494 is a resistor. Components 496 and 498 are transistors. Component 500 is an LED driver chip that outputs a pulse width modulated signal. Component 502 is an inductor. Component 504 is a capacitor. Component 506 is a diode. Outputs 508 may be connected to one or more LEDs to power the LEDs in one of three states: low, medium, and high illumination.

Although a feature may appear to be described in connection with a particular embodiment, one skilled in the art would recognize that various features of the described embodiments may be combined. Moreover, aspects described in connection with an embodiment may stand alone.

What is claimed is:

1. A light emitting diode (LED) bulb comprising:
a shell;
a plurality of LEDs within the shell; and
a driver circuit configured to operate the plurality of LEDs at a plurality of brightness levels, the driver circuit comprising:
a first input configured to receive alternating current (AC);
a second input configured to receive AC;
a neutral input;
a converter circuit connected to the plurality of LEDs;
a first rectifier circuit connected to the first input and the neutral input, the first rectifier circuit configured to rectify the AC received at the first input into direct current (DC);
a second rectifier circuit connected to the second input and the neutral input, the second rectifier circuit configured to rectify the AC received at the second input into DC;
one or more detector circuits, the one or more detector circuits connected to the first rectifier circuit and the second rectifier circuit;
a signal processing circuit having a first processor input and a second processor input, the signal processing circuit connected to the one or more detector circuits; and
wherein the signal processing circuit is configured to produce a chop signal with a duty cycle, the duty cycle based on whether the first input is hot and whether the second input is hot; and
wherein the converter circuit powers the plurality of LEDs at a driving current, the driving current based on the chop signal.

2. The LED bulb of claim 1, wherein:
the signal processing circuit is configured to determine whether the first input is hot based on a first duration of a first processor signal received at the first processor input;
the first duration of the first processor signal based on time that the first processor signal is above a first threshold voltage;
the signal processing circuit is configured to determine whether the second input is hot based on a second duration of a second processor signal received at the second processor input; and
the second duration of the second processor signal based on time that the second processor signal is above a second threshold voltage.

3. The LED bulb of claim 2, wherein:
the signal processing circuit is configured to produce the chop signal with the duty cycle set to:
a first duty cycle, in response to determining that the first input is hot and the second input is not hot,
a second duty cycle, in response to determining that the first input is not hot and the second input is hot, and
a third duty cycle, in response to determining that the first input is hot and the second input is hot; and
the first duty cycle, the second duty cycle, and the third duty cycle are not equal.

4. The LED bulb of claim 3, wherein the third duty cycle is larger than the first duty cycle and the third duty cycle is larger than the second duty cycle.

5. The LED bulb of claim 2, wherein each of the one or more detector circuits are configured to produce an ON signal in response to receiving an input above a first detector voltage threshold and configured to produce an OFF signal in response to receiving an input below a second detector voltage threshold.

6. The LED bulb of claim 2, wherein:
the first rectifier circuit is a full-wave bridge rectifier circuit configured to convert AC to direct current (DC); and
the second rectifier circuit is a full-wave bridge rectifier circuit configured to convert AC to DC.

7. The LED bulb of claim 2, the driver circuit further comprising:
   a switch mode power supply (SMPS) circuit, the SMPS circuit configured to produce a pulse width modulated signal; and
   wherein the converter circuit is configured to power the plurality of LEDs based on the pulse width modulated signal.

8. The LED bulb of claim 7, the driver circuit further comprising:
   an AND circuit connected to the SMPS circuit and the signal processing circuit, the AND circuit configured to perform an AND operation on the pulse width modulated signal of the SMPS circuit and the chop signal of the signal processing circuit; and
   a switch circuit connected to the AND circuit, the switch configured to short the converter circuit to an output of the first rectifier circuit in response to receiving a HIGH signal from the AND circuit.

9. A light emitting diode (LED) bulb driver circuit configured to operate an LED bulb at a plurality of brightness levels, the LED bulb driver circuit comprising:
   a first input configured to receive alternating current (AC);
   a second input configured to receive AC;
   a neutral input;
   a converter circuit connected to a plurality of LEDs;
   a first rectifier circuit connected to the first input and the neutral input, the first rectifier circuit configured to rectify the AC received at the first input into direct current (DC);
   a second rectifier circuit connected to the second input and the neutral input, the second rectifier circuit configured to rectify the AC received at the second input into DC;
   one or more detector circuits, the one or more detector circuits connected to the first rectifier circuit and the second rectifier circuit;
   a signal processing circuit having a first processor input and a second processor input, the signal processing circuit connected to the one or more detector circuits; and
   wherein the signal processing circuit is configured to produce a chop signal with a duty cycle, the duty cycle based on whether the first input is hot and whether the second input is hot; and
   wherein the converter circuit powers the plurality of LEDs at a driving current, the driving current based on the chop signal.

10. The driver circuit of claim 9, wherein:
    the signal processing circuit is configured to determine whether the first input is hot based on a first duration of a first processor signal received at the first processor input;
    the first duration of the first processor signal based on time that the first processor signal is above a first threshold voltage;
    the signal processing circuit is configured to determine whether the second input is hot based on a second duration of a second processor signal received at the second processor input; and
    the second duration of the second processor signal based on time that the second processor signal is above a second threshold voltage.

11. The LED bulb driver circuit of claim 10, wherein:
    the signal processing circuit is configured to produce the chop signal with the duty cycle set to:
      a first duty cycle, in response to determining that the first input is hot and the second input is not hot,
      a second duty cycle, in response to determining that the first input is not hot and the second input is hot, and
      a third duty cycle, in response to determining that the first input is hot and the second input is hot; and
    the first duty cycle, the second duty cycle, and the third duty cycle are not equal.

12. The driver circuit of claim 11, wherein the third duty cycle is larger than the first duty cycle and the third duty cycle is larger than the second duty cycle.

13. The driver circuit of claim 10, wherein each of the one or more detector circuits are configured to produce an ON signal in response to receiving an input above a first detector voltage threshold and configured to produce an OFF signal in response to receiving an input below a second detector voltage threshold.

14. The driver circuit of claim 10, wherein:
    the first rectifier circuit is a full-wave bridge rectifier circuit configured to convert AC to direct current (DC); and
    the second rectifier circuit is a full-wave bridge rectifier circuit configured to convert AC to DC.

15. The LED bulb driver circuit of claim 10, further comprising:
    a switch mode power supply (SMPS) circuit, the SMPS circuit configured to produce a pulse width modulated signal; and
    wherein the converter circuit is configured to power the plurality of LEDs based on the pulse width modulated signal.

16. The LED bulb driver circuit of claim 15, further comprising:
    an AND circuit connected to the SMPS circuit and the signal processing circuit, the AND circuit configured to perform an AND operation on the pulse width modulated signal of the SMPS circuit and the chop signal of the signal processing circuit; and
    a switch circuit connected to the AND circuit, the switch configured to short the converter circuit to an output of the first rectifier circuit in response to receiving a HIGH signal from the AND circuit.

* * * * *